United States Patent [19]

Corson

[11] 3,852,038

[45] Dec. 3, 1974

[54] APPARATUS FOR THE REACTIVATION OF POWDERED CARBON

[75] Inventor: Floyd L. Corson, Brookfield, Ill.

[73] Assignee: CPC International Inc., Chicago, Ill.

[22] Filed: Aug. 6, 1973

[21] Appl. No.: 385,755

Related U.S. Application Data

[62] Division of Ser. No. 113,214, Feb. 8, 1971, Pat. No. 3,816,338.

[52] U.S. Cl. ............... 23/259.9, 23/284, 23/277 R, 423/449, 252/421, 252/445, 201/17
[51] Int. Cl. ............................................. C01b 31/08
[58] Field of Search.... 23/259.9, 284, 259.5, 277 R; 423/449; 252/421, 445; 201/17, 38, 34

[56] References Cited
UNITED STATES PATENTS

| | | | |
|---|---|---|---|
| 1,379,187 | 5/1921 | Kaufman | 23/277 R |
| 3,101,258 | 8/1963 | Johnson | 23/277 R |
| 3,595,806 | 7/1971 | Prahacs et al. | 23/277 R X |

*Primary Examiner*—James H. Tayman, Jr.
*Attorney, Agent, or Firm*—Albert P. Halluin

[57] ABSTRACT

This application discloses apparatus for the reactivation of spent powdered carbon having organic matter adsorbed thereon, comprising: an elongate, generally tubular reactor vessel having a wall and a bore, and an inlet at one of its ends and an outlet at the opposite end, and means generally sealing each of its ends to provide, with said wall, an enclosed reaction chamber in the bore of said vessel; means communicating with said inlet end for supplying to said reaction chamber a stream of spent carbon dispersed in steam; heating means disposed about said reactor vessel wall for radiantly heating said wall to a temperature in the range from about 1200°F to about 1900°F, and means communicating with the outlet end of said reactor vessel for removing processed carbon from the reaction chamber; whereby a stream of spent carbon may be passed through said reaction chamber, in an atmosphere substantially free of oxygen, at a temperature of at least 1200°F, for pyrolysis of the adsorbed organic matter and reactivation of the carbon.

5 Claims, 3 Drawing Figures

APPARATUS FOR THE REACTIVATION OF POWDERED CARBON

This application is a divisional patent application of U.S. patent application Ser. No. 113,214, filed Feb. 8, 1971 now U.S. Pat. No. 3,816,338 patented June 11, 1974.

The present invention relates to a process for the reactivation of carbon. More particularly, the present invention relates to a continuous process for reactivating powdered carbon by pyrolysis in an atmosphere of superheated steam.

Carbons of vegetable and animal origin in powdered form are widely used in industry for removing undesirable color and odor from liquids. One example of the use of powdered carbon is in the treatment of sewage or industrial wastewaters to remove pollutants and render such waters safe for aquatic life and often fit for human consumption. A further example for the use of powdered carbon is in the refining of sugar syrups such as those obtained from sugar cane or corn starch. In such purification processes the impurities responsible for the objectionable color or odor are adsorbed or otherwise retained by the carbon, whereby the carbon becomes spent, and its activity for this purpose is reduced or totally destroyed.

The impurities in spent carbon are primarily organic in nature and are, for the most part, combustible. In attempts to revivify spent carbon, the combustibles have heretofore been removed by heating the carbon to high temperatures in the presence of air or other oxygen-containing gases which results in the impurities being burned out of the carbon.

Thus, Davis in U.S. Pat. No. 1,945,479, discloses a method of revivifying spent activated carbon wherein a mixture of the spent carbon with air is ignited in a furnace at a temperature ranging from about 800°C to about 1000°C to selectively burn out the adsorbed impurities from the carbon. This procedure requires careful control of the proportions of oxygen to carbon present in the ignited mixture in order to achieve the selective oxidation.

A further method of reactivating spent carbon is disclosed in Repik et al. in U.S. Pat. No. 2,933,454, wherein wet carbon is first devolatilized in the absence of oxygen at temperatures ranging from 250°F to 800°F and wherein the dried carbon is then transferred into a fluidized bed in the presence of an oxygen-containing gas at a temperature of from about 1200°F to 1600°F to burn off impurities from the active surface of the carbon. This fluidized bed technique is useful in reactivating granular carbon.

Although the described reactivation methods have found some acceptance in the art, they have not been entirely satisfactory. The temperature of the oxidation reactivation is often high enough to cause the carbon to glow, and only by the most careful control of the concentration of oxygen in the regenerating gas can the oxidation of the carbon be maintained without burning the carbon as well as the impurities. As a result, oxidation procedures are typically accompanied by excessive product losses.

The fluidized bed procedure described above further suffers from the disadvantage of long reactivation times with the consequent need for large volume equipment. The reactivation of spent carbon described by Repik et al. typically requires a holding time ranging from 0.2 to 2.0 hours.

The various problems associated with regenerating powdered carbon by the procedures of the prior art have kept them from being used commercially. The various processes have been so unsuccessful that wherever powdered carbon is used in industry, it is more economical to dispose of the spent carbon by burning or dumping it, and using virgin carbon than it is to reactivate the spent product. In view of the increased awareness of the pollution of our environment, the practice of burning or dumping the spent carbon is becoming less and less desirable. Accordingly, there exists a great need in industry today for a process of reactivating spent carbon which can be economically carried out on a commercial scale.

It has now been discovered that spent powdered carbon can be reactivated on a commercial scale at a cost of less than one-half the cost of virgin carbon. Moreover, it has been found that powdered carbon can be reactivated by a procedure which does not require the use of oxygen-bearing gases and therefore obviates the critical control of oxidizing gases required for the selective oxidation of impurities. Furthermore, it has been found that powdered carbon can be reactivated to a reactivation efficiency of at least about 80 percent and typically 90 percent and higher in substantially quantitative yields within a matter of seconds.

The term "reactivation efficiency" is used herein to designate the relative efficiency of the reactivated carbon as compared to activated virgin carbon. The reactivation efficiency can be determined by the following procedure.

A quantity of a test liquor, which is typically subjected to carbon treatment, is obtained. The pH of the test liquor is adjusted to $5.0 \pm 0.2$ and the gravity is determined at 60°F to the nearest 0.1° Baume. A sample of reactivated carbon and a sample of standard 325 mesh virgin carbon are dried at 120°C for 4 hours under vacuum. The reactivated carbon is milled to pass through a 325 mesh sieve. The carbon is stored in sealed containers.

Four different amounts of reactivated and standard carbon are weighed to effect uniform intervals of decolorization of test liquor from 50 percent to 90 percent color removal. As previous experience has indicated, if the test liquor is in the 7 to 12 optical density (OD) range, carbon sample weights of 0.15, 0.25, 0.50, and 0.80 grams can satisfy the requirement. Test liquor color in the 13 to 20 OD range requires carbon sample weights of 0.30, 0.80, 1.30, and 1.70. The required carbon sample weights are then transferred to one-pint Mason jars.

Four hundred millimeters of the prepared test liquor are measured and transferred to each of 14 jars. The tightly sealed jars are placed in the rotating agitator and submerged in a water bath at 160°F for 1 hour. At the end of 1 hour, the agitator is removed from the bath and the test liquor is cooled for a period of 30 minutes. The contact time in the bath and the cooling time should be accurately timed. Three teaspoons of Standard Celite are added and the sample is filtered through a Horman D-7 vacuum filter pad 111 mm in diameter to remove the carbon and clarify the test solution. In order to obtain accurate colors, the clarity of the test solution should be 92+. A total filtration time of approximately 5 minutes, to minimize differences in contact time from the start to the end of the operation, is required for all samples.

The following procedure is suggested for calculating the apparent Relative Efficiency (R.E.) of powdered carbon:

The solution color of each filtrate is determined using the spectrophotometer. Absorbance readings (A) are taken at 450 m$\mu$ and 600 m$\mu$ wave lengths.

The calculation is made as follows:

Solution Color ($\times 100$)
$$= \frac{(A \text{ at } 450 \text{ m}\mu - A \text{ at } 600 \text{ m}\mu)}{10 \text{ cm. Cell Length}} \times 100$$

The term "color is defined as corrected absorbance (optical density) at 450 m$\mu$ through one centimeter at the specified concentration (40° Be 60°F/60°F) and is equal to 2-Log % T. The factor 100 converts absorbance to whole number values which are more readily differentiated. The reading at 600 m$\mu$ corrects for conditions that interfere with light transmittance without contributing to color, and is a satisfactory indication of clarity.

"Color remaining" of each decolorization solution is subtracted from the blank to obtain "color removed". Dry substance used to obtain "color removed per gram" is divided by weights of carbon.

On logarithmic 2×3 cycle paper, "color remaining" is plotted on the horizontal scale and "color removed per gram" is plotted on the vertical scale. A straight line is drawn through the four points representing each carbon and the standard. A vertical line is drawn at the point representing 90 percent decolorization (10 percent of "color remaining" in the blank) by the standard carbon. The two points are then read on the vertical scale where the lines intersect:

$$R.E. = \frac{\text{Point of Intersection of Sample} \times 100}{\text{Point of Intersection of Standard Carbon}}$$

The process of the present invention in its broadest scope comprises pyrolyzing spent powdered carbon in an atmosphere of steam and in the absence of oxygen under specific concentrations and reaction conditions. According to the present process, spent carbon is slurried with water and is atomized with steam to form an atomized suspension at the upper end of a reactor. In the reactor, the carbon passes through two zones. In the first zone, water is evaporated and the carbon is dried and heated to pyrolysis temperatures. In the second zone, the atomized suspension of heated carbon is maintained at pyrolysis temperatures just long enough to drive off the impurities in the carbon as a gas. The reactivated carbon particles suspended in the gaseous mixture of steam and pyrolysis gases are then discharged at the bottom of the reactor after which the carbon particles are recovered.

To effect the general procedure outlined above, a variety of specific conditions must be met. Furthermore, to carry out the reactivation successfully, a reactor as well as a particular kind of furnace, as will be hereinafter described, is required.

The process of this invention is restricted to regenerating powdered carbon and cannot be used on granular carbon. The powdered carbon which can be regenerated must have a particle size smaller than about 100 mesh (U.S. Standard Sieve). A typical powdered carbon will have a particle size such that at least 95 percent by weight of the carbon will pass through a sieve of about 100 mesh and 70 percent through 325 mesh screen.

As indicated, the spent powdered carbon is first slurried or dispersed in water to form an aqueous suspension having a solids content of from about 20 percent to about 35 percent by weight. Lower concentrations, while operative in the process of this invention, do not make full use of the reactivation capacity of the process and are, therefore, inefficient. Higher concentrations are not practical since powdered carbon slurries in excess of 35 percent by weight solids are difficult to transport and cannot be pumped or atomized into the reaction vessel.

In most industrial processes using powdered carbon, the carbon is in a wet state. As a result, the spent carbon can be readily dispersed at the required concentration in aqueous medium required by the process of this invention. The dispersion of the powdered carbon can be readily prepared by metering the carbon and required water into a suitable vessel equipped with mixing means and stirring the mixture until a uniform suspension is obtained. The resulting suspension can then be further conveyed by pumping.

After an aqueous suspension of the powdered carbon has been prepared, it is pumped to one or more atomizing spray nozzles located in the upper end of the reactor described hereinafter. Steam is also passed to the atomizing spray nozzle or nozzles. Each nozzle functions to mix the slurry of spent carbon and the steam, forming an atomized suspension of carbon slurry. The atomizing spray nozzles employed may be of the so-called external mixing type nozzles or the internal mixing type. In the external mixing type nozzle, the spent carbon slurry and the steam each pass through their own outlet orifices and mix immediately after exiting the nozzle. In the internal mixing nozzles, the steam and carbon slurry are mixed in a chamber within the nozzle and atomize upon leaving the nozzle.

It has been found that the external mixing type nozzle gives a continuous uniform atomized suspension and requires very little carbon slurry pressure, whereas the internal type nozzle gives a discontinuous dispersion. An unsatisfactory atomized suspension results in build-up on the wall of the reactor vessel tube. Subsequently, sheets of this material dislodge and fall to the bottom of the reactor vessel, restricting the normal flow at the product discharge. Any restriction of flow of the product discharge can cause excessive pressures in the reactor vessel, necessitating extensive shut-downs, for clean-out, with resultant loss of production. As a result, in a preferred embodiment of the present invention external mixing nozzles are employed. The steam supply pressure to the atomizing nozzles is controlled to ensure a constant and uniformly atomized suspension. Useful steam pressures for obtaining a suitable atomized suspension range from about 40 to 100 pounds per square inch with a carbon supply rate of about 1 to 6 gallons per minute.

After the aqueous suspension of powdered carbon is atomized with steam, it is passed through a radiantly heated reactor vessel having a wall temperature of from about 1200°F to about 1900°F within a time period of from about 5 to about 30 seconds. The reactor vessel comprises a first zone capable of heating the suspension to a temperature of at least about 1200°F within a period of from about 3 to about 15 seconds and a second zone capable of maintaining the temperature of the suspension between about 1200°F and about 1900°F for the remainder of its residence time within the reactor vessel.

In order to impart the elevated temperatures within the short residence time to the carbon suspension, a reactor vessel in the general shape of an elongated tube having a longitudinal dimension, in proportion to its cross-sectional dimension, of from about 1 to 10 to about 1 to 20 is used. The reactor vessel is heated by a radiant heat gas furnace to provide an inside wall temperature ranging from about 1200°F to about 1900°F. The first zone of the reactor vessel comprises the upper one-third to two-thirds of the elongated reactor vessel. In this zone the aqueous phase of the carbon suspension is converted to steam and the carbon and steam mixture is heated to the reactivation temperatures of at least about 1200°F.

Materials of construction for the reactor vessel must resist oxidation and have a melting point of 2200°F or above. Since reacting temperatures up to 1900°F are used, furnace temperatures must be very uniform in order to operate near the critical temperature of 2200°F for maximum heat transfer and still not destroy the reactor vessel. Radiant furnaces meet this requirement much more readily than high velocity furnaces. Further, due to the high level of heat input per square foot of transfer surface, electrically heated furnaces are uneconomical.

To facilitate heating of the mixture to the high temperature in a period of from about 3 to 15 seconds, a convection tube can be used in the first zone of the reactor vessel. A convection tube generally comprises an elongated tube open at both ends having cross-sectional dimensions somewhat smaller than the reactor vessel thereby forming a space between its outer surface and the inner surface of the reactor vessel sufficient to provide an updraft of gases as a result of the temperature differences between the gases on the inside and outside of the convection tube. The updraft, consisting of carbon particles suspended in superheated steam, is thereby recycled to the upper portion of the reactor vessel where the atomized carbon dispersion enters the furnace and mixes with the dispersion, providing a more efficient heat exchange. A typical convection tube useful in a reactor vessel required for the process of this invention extends along the upper one-tenth to one-third of the reactor vessel wall and provides a space between the reactor vessel wall and itself equal to about one-fourth to about one-twentieth of the cross-sectional dimension of the reactor vessel. Thus, a reactor vessel in the form of a cylindrical tube 24 inches in diameter and 30 feet in length can have a convection tube which is also cylindrical and has a diameter of from about 14 to about 20 inches and a length of from about 3 to about 10 feet. While the use of a convection tube is not essential in the process of the present invention, it is a preferred embodiment thereof.

It should be pointed out that the convection tube, as contemplated herein, provides for the recycling of about 50 percent to about 90 percent by weight of the carbon suspension and that a minor portion of the suspension passes directly through the reactor vessel.

The reactivation unit and particularly the reactor vessel is described herein in a vertical position with the carbon suspension entering the top of the reactor vessel and passing through the vessel in a downward direction. While there are advantages in this positioning of the equipment, the present invention is not restricted thereto. The regeneration of powdered carbon in accordance with the process of the present invention can also be carried out with the reactor vessel in a horizontal position. Furthermore, the carbon suspension can be sprayed into the bottom of a reactor vessel and passed through the vessel in an upward direction, provided the various conditions, as herein set forth, are met.

After the carbon suspension leaves the first zone of the reactor vessel, it passes through a second zone wherein the temperature of the suspension is maintained between about 1200°F and about 1900°F to pyrolyze the impurities in the carbon. The temperature which is most effective in reactivating the carbon can vary within the range set forth, depending on the particular size of the carbon, the total residence time of the carbon within the furnace, and the carbon content of the aqueous suspension entering the reactor. The residence time of the carbon suspension in the second zone of the reactor vessel can range from about 2 to about 15 seconds to pyrolyze the impurities within the carbon. After this time, the reactivate carbon leaves the reactor vessel suspended in steam and pyrolysis products and can be recoverd by conventional means.

In carrying out the process of the present invention, the carbon suspension is passed through the radiantly heated reactor vessel in an atmosphere substantially free of oxygen. This oxygen-free atmosphere is provided by spraying the carbon slurry into one end of a closed reactor having only an exit port at the other end at which the products are expelled. The oxygen-free atmosphere is further provided by the vaporization of the water from the aqueous carbon slurry and by the use of steam rather than air for the purpose of atomizing the carbon slurry as it enters the reactor. As a result, the carbon is reactivated via pyrolysis rather than oxidation. This procedure permits the use of exceedingly high reactivation temperatures with negligible carbon losses.

It can now be seen that the advantages of the present invention are realized by a continuous process which comprises the reactivation of spent powdered carbon containing adsorbed organic matter, having a particle size smaller than about 100 mesh, to a reactivation efficiency of at least about 80 percent, and a product yield of at least about 90 percent by weight which comprises dispersing the spent carbon in water to form an aqueous suspension having a solids content of from about 20 percent to about 35 percent by weight; atomizing the suspension with steam and passing the atomized suspension, in an atmosphere substantially free of oxygen, through a radiantly heated reactor vessel having a wall temperature of from about 1200°F to about 1900°F within a time period of from about 5 to about 30 seconds by spraying the suspension into a first zone of the reactor vessel capable of heating the suspension to a temperature of at least about 1200°F within a period of from about 3 to about 15 seconds, and then passing the heated suspension into a second zone of the reactor vessel capable of maintaining the temperature of the suspension between about 1200°F and about 1900°F for the remainder of its residence within the reactor vessel to pyrolyze the impurities within the carbon; and thereafter recovering the reactivated carbon.

A preferred embodiment of the present invention resides in a continuous process for the reactivation of spent powdered carbon containing adsorbed organic matter and having a particle size smaller than about 100 mesh, to a reactivation efficiency of at least about 90 percent and a product yield of at least about 95 percent by weight which comprises dispersing the spent carbon in water to form an aqueous suspension having a solids content of from about 22 percent to about 32 percent by weight; atomizing the suspension with steam and passing the atomized suspension, in an atmosphere substantially free of oxygen, through a radiantly heated reactor vessel having a wall temperature of from about 1500°F to about 1800°F within a time period of from about 5 to about 15 seconds by spraying the suspension into a first zone of the reactor vessel capable of heating the suspension to a temperature of at least about 1500°F within a period of from about 3 to about 7 seconds and equipped with a convection tube, and then passing the heated suspension into a second zone of the reactor vessel capable of maintaining the temperature of the suspension between about 1500°F and about 1800°F for the remainder of its residence time within the reactor vessel to pyrolyze the impurities within the carbon; and thereafter recovering the reactivated carbon.

A further preferred embodiment of the present invention comprises spraying the suspension into a first zone of the reactor vessel capable of heating the suspension to a temperature about equal to the reactor vessel wall temperature within a period of about 3 to about 15 seconds and then passing the heated suspension into a second zone of the reactor vessel capable of maintaining the temperature of the suspension about equal to the reactor vessel wall temperature for the remainder of its residence time within the reactor vessel.

One embodiment of the process of the present invention is illustrated in the accompanying drawings. It should be understood, however, that the drawings are given for the purposes of illustration and that the invention, in its broadest aspects, is not limited thereto.

Figure 1:
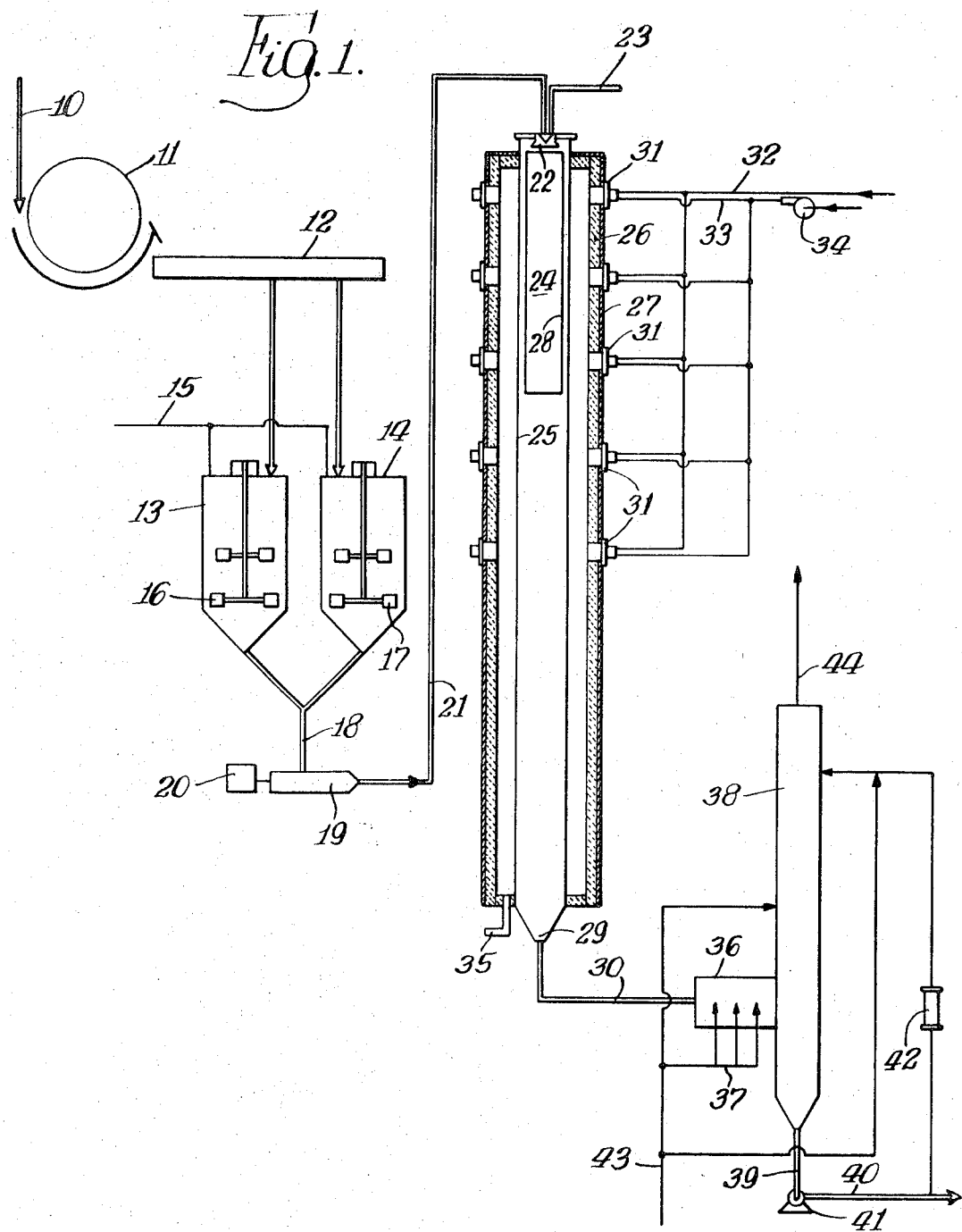
FIG. 1 is a somewhat schematic representation of a preferred method of practicing the process of this invention.

Referring now to the drawings, FIG. 1 shows a spent carbon feed stream 10 derived from a process utilizing powdered carbon in a liquid suspension. The carbon is recovered from the feed stream by a suitable filter 11, resulting in a carbon mass having a solids content of from about 35 percent to about 45 percent by weight. The carbon mass is then transported via a conveyor 12 to one or more mixing tanks 13 and 14, wherein it is dispersed in water provided from a make-up water supply 15. The mixing tanks are equipped with mechanical stirring means 16 and 17 capable of providing sufficient agitation to form an aqueous suspension having a solids content within the required ranges heretofore described. The aqueous carbon suspension is then passed through a conduit 18 and 21 with the aid of a metering pump 19 which is powered by a suitable driving means 20, to a spray nozzle 22 positioned at one end of a radiantly heated reactor vessel 25. The aqueous suspension of powdered carbon is atomized with steam provided from a steam supply line 23 in the supply nozzle 22, and is then passed through the radiantly heated reactor vessel 25.

Figure 2:
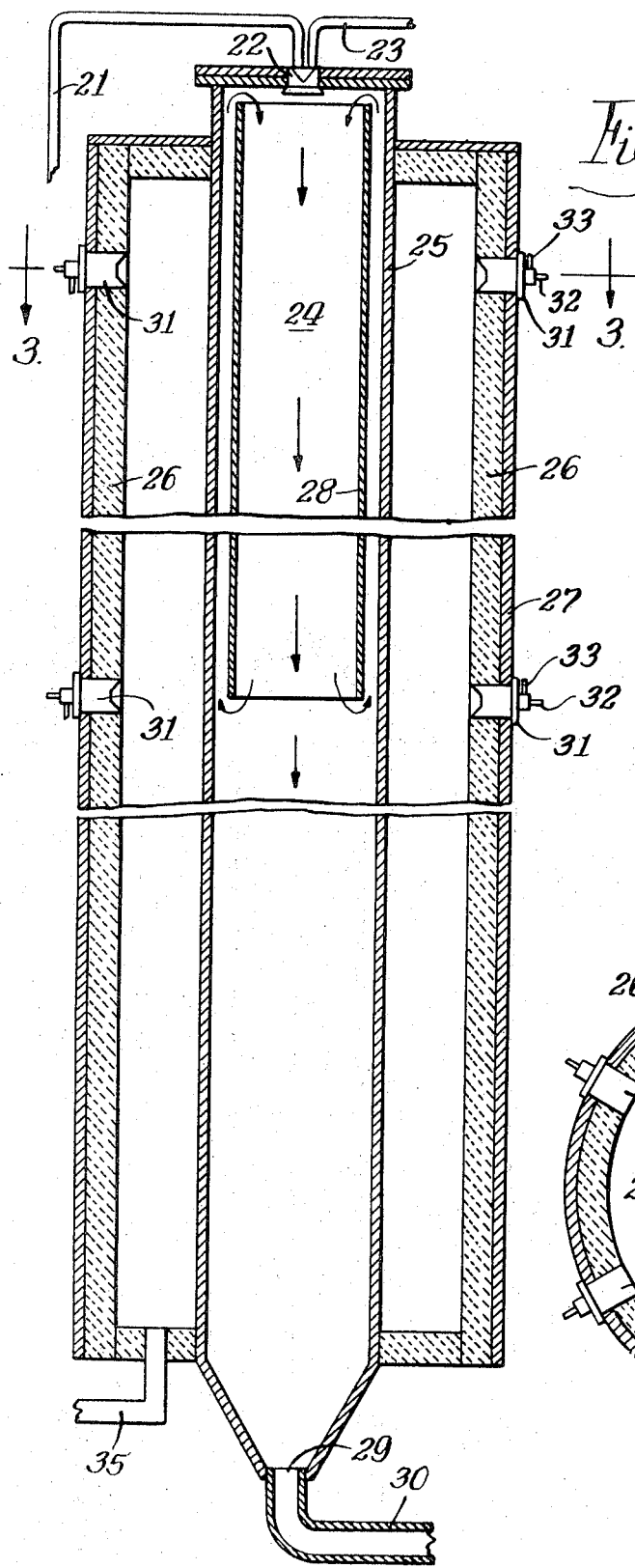
FIG. 2 is an enlarged view of a discontinuous longitudinal section of a reactivation unit of this invention.
Figure 3:
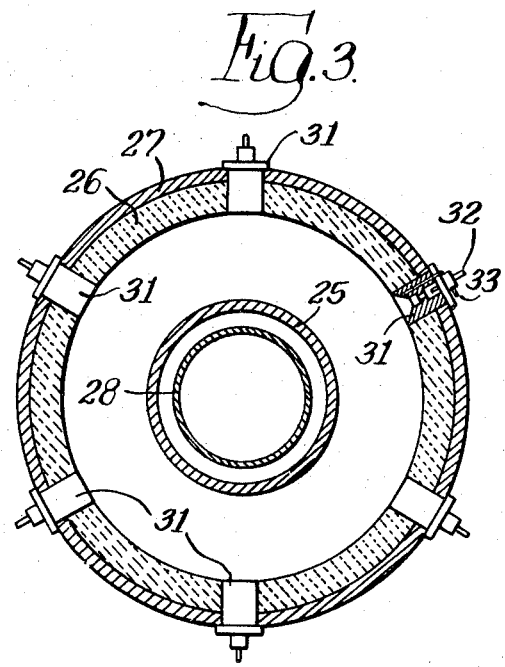
FIG. 3 is a cross-section of the reactivation unit taken along line 3—3 of FIG. 2 showing the burner assembly of the furnace.

The reactivation unit 24 comprises a reactor vessel 25 of a suitable longitudinal dimension in proportion to its cross-sectional dimension which is housed in a furnace. The furnace comprises a refractory shell 26 which is covered with an insulating material forming the furnace wall 27. A plurality of burners 31 are mounted against the furnace wall so as to provide a gas-tight mounting. As shown in FIGS. 2 and 3, a plurality of burner banks are mounted in the furnace wall with each burner in each bank spaced in relationship to each other about the perimeter of the furnace and with each of the banks in a spaced vertical relationship to each other. These burners are of a design such that they provide a relatively short and wide flame which will not impinge on the reactor vessel wall and, therefore, provide heat to this wall by radiation as opposed to convection. The burner banks are disposed in the upper portions of the furnace to provide heat to those zones within the reactor wherein water is being evaporated from the carbon slurry and wherein the dried slurry is heated to reactivation temperatures. The burners are typically mounted in the upper two-thirds portion of the furnace. The burners are supplied with a combustible gas and combustion air through the supply tubes 32 and 33, respectively. The combustion air is supplied from an air blower 34 at a suitable pressure for the operation of the burners. The furnace is vented with a flue gas vent 35 which is shown in the drawings at the lower end of the furnace. The positioning of this flue gas vent can be changed to the upper end of the furnace.

To provide a more efficient heat exchange between the reactor vessel walls and the carbon slurry, a convention tube 28 is shown within the upper portion of the reactor vessel 25. This convection tube comprises an elongated shell having a similar cross-sectional geometry as the reactor vessel and provides a space between the reactor vessel wall and itself. The convection tube is open at both ends and extends for one-tenth to one-third of the reactor vessel length.

The aqueous suspension of powdered carbon, upon leaving the spray nozzle 22, enters the convection tube 28 and flows in a downward direction. Upon leaving the convection tube, a major portion of the carbon suspension, which is now in the form of carbon particles suspended in superheated steam, is recycled in an upward direction in the space between the convection tube and the re actor vessel wall. As this recycle stream passes along in close proximity of the heated reactor vessel wall, it approaches the temperature of the wall. Upon reaching the upper portion of the reactor vessel, this recycle stream mixes with the incoming carbon suspension and thereby imparts substantial heat thereto.

The carbon suspension is recycled within the reactor vessel, passes in a downward direction through the vessel, and leaves through an exit port 29. After leaving the reactor vessel, the carbon suspension having been reactivated, passes through a conduit 30, to a quenching chamber 36 where it is cooled by quenching sprays 37. The carbon suspension then passes into a scrubber 38, wherein the carbon and condensed steam is separated from non-condensible pyrolysis gases. The pyrolysis gases leave the scrubber 38 through a vent 44 and can be recovered for use as a fuel gas. The scrubbed carbon suspended in water exits the scrubber through a discharge line 39 and is conveyed to finished product line 40 with the help of a pump 41. A portion of the scrubbed carbon is sent to a heat exchanger 42 for further cooling, and is mixed with water from a make-up water supply 43 and is recycled into the scrubber for use as a coolant and scrubbing aid.

The process of the present invention can be conveniently used to provide regenerated carbon in an aqueous suspension of a particular concentration required by a process stream. As a result, the separate preparation of aqueous carbon suspensions necessary when powdered carbon is used in filtering, purification, and refining procedures is avoided and results in a significant savings in the operating costs of these procedures.

The process of this invention is further illustrated in the following examples.

EXAMPLE I

Spent powdered carbon of 325 mesh particle size suspended in an aqueous solution at a concentration of about 3 percent by weight is recovered by filtration using a plate press filter to yield a carbon cake having a solids content of about 50 percent. This carbon cake is conveyed to a mixing tank (500 gal.) equipped with a center mounted agitator. Carbon cake is added to a predetermined volume of water in the mixing tank in an amount sufficient to provide an aqueous suspension of the powdered carbon having a solids content of about 30 percent by weight. The suspension of carbon is then pumped to a reactivation unit having a radiantly heated cylindrical reactor vessel 24 inches in reactor 30 feet in height and equipped with a convection tube mounted in the upper portion of the reactor vessel having a diameter of 18 inches and a length of 6 feet. The reactor vessel wall is heated to a temperature of about 1300°F with radiant heat provided from five banks of burners consisting of six radially mounted burners each, and the carbon suspension is continuously sprayed into the reactor vessel at a rate of 1.0 gallon per minute through a spraying nozzle mounted in the upper end wall of the reactor vessel utilizing atomizing steam at a pressure of about 50 psig. The carbon suspension is heated to about 1300°F within 6 seconds and is retained in the reactor vessel for an average residence time of about 12 seconds to reactivate the carbon by pyrolysis of the impurities. After this time, the reactivated carbon suspension is discharged from the reactor vessel through a 4 inch exit port located at the bottom of the vessel and is passed into a quenching chamber. The carbon suspension is subjected to water sprays in the quenching chamber to cool the steam generated in the furnace. The resulting reactivated carbon suspension is then subjected to a scrubber wherein the pyrolysis gases generated during reactivation are removed from the carbon slurry to yield an aqueous suspension of reactivated carbon having a carbon content of 0.5 pounds per gallon at a temperature of about 180°F, in a yield of about 95 percent by weight based on the weight of spent carbon starting material and having a reactivation efficiency of about 90 percent.

EXAMPLE II

Spent powdered carbon having a 200 mesh particle size and suspended in an aqueous solution at a concentration of about 5 percent by weight is recovered by filtration using a plate press filter to yield a carbon slurry having a solids content of about 40 percent. This carbon slurry is conveyed to a mixing tank (300 gal.) equipped with a center mounted agitator. Carbon cake is added to a predetermined volume of water in the mixing tank in an amount sufficient to provide an aqueous suspension of the powdered carbon having a solids content of about 32 percent by weight. The suspension of carbon is then pumped to a radiantly heated reactor vessel consisting of a closed cylindrical tube 24 inches in diameter and 30 feet in height and equipped with a convection tube mounted in the upper portion of the reactor vessel having a diameter of 18 inches and a length of 10 feet. The reactor vessel wall is heated to a temperature of about 1500°F with radiant heat provided from five banks of burner consisting of six radially mounted burners each, and the carbon suspension is continuously sprayed into the reactor vessel at a rate of 540 pounds per hour through a spraying nozzle mounted in the upper end wall of the reactor vessel, utilizing atomizing steam at a pressure of about 50 psig. The carbon suspension is heated to a temperature of about 1500°F within about 6 seconds and is retained in the reaction vessel for an average residence time of about 11 seconds to reactivate the carbon by pyrolysis of the impurities. After this time, the reactivated carbon suspension is discharged from the reactor vessel through a 4 inch exit port located at the bottom of the vessel and is passed into a quenching chamber. The carbon suspension is subjected to water sprays in the quenching chamber to cool the steam generated in the furnace. The resulting reactivated carbon suspension is then subjected to a scrubber wherein the pyrolysis gases generated during reactivation are removed from the carbon slurry to yield an aqueous suspension of reactivated carbon having a carbon content of 0.8 pounds per gallon at a temperature of about 180°F, in a yield of over 90 percent by weight based on the weight of spent carbon starting material and having a reactivation efficiency greater than about 95 percent.

EXAMPLE III

Spent carbon of 100 mesh particle size suspended in an aqueous solution at a concentration of about 4 percent by weight is recovered by filtration using a rotary vacuum knife-discharge filter to yield a carbon slurry having a solids content of about 40 percent. This carbon slurry is conveyed to a mixing tank (500 gal.) equipped with a center mounted agitator. Carbon cake is added to a predetermined volume of water in the mixing tank in an amount sufficient to provide an aqueous suspension of the powdered carbon having a solids content of about 20 percent by weight. The suspension of carbon is then pumped to a radiantly heated reactor vessel consisting of a closed cylindrical tube 12 inches in diameter and 20 feet in height and equipped with a convection tube mounted in the upper portion of the reactor vessel having a diameter of 8 inches and a length of 5 feet. The reactor vessel wall is heated to a temperature of about 1200°F with radiant heat provided from five banks of burners consisting of four radially mounted burners each, and the carbon suspension is continuously sprayed into the reactor vessel at a rate of 50 pounds per hour through a spraying nozzle mounted in the upper end wall of the reactor vessel, utilizing atomizing steam at a pressure of about 50 psig. The carbon suspension is heated to a temperature of about 1200°F within 4 seconds and is retained in the reactor vessel for an average residence time of about 8 seconds to reactivate the carbon by pyrolysis of the impurities. After this time, the reactivated carbon suspension is discharged from the reactor vessel through a 2 inch exit port located at the bottom of the vessel and is passed into a quenching chamber. The carbon suspsension is subjected to water sprays in the quenching chamber to cool the steam generated in the furnace. The resulting reactivated carbon suspension is then subjected to a scrubber wherein the pyrolysis gases generated during reactivation are removed from the carbon slurry to yield an aqueous suspension of reactivated carbon having a carbon content of 1.0 pound per gallon at a temperature of about 170°F, in a yield in excess of 90 percent by weight, and having a reactivation efficiency greater than about 95 percent.

EXAMPLE IV

Spent powdered carbon of 325 mesh particle size suspended in an aqueous solution at a concentration of about 5 percent by weight is recovered by filtration using a plate filter to yield a carbon slurry having a solids content of about 60 percent. This carbon slurry is conveyed to a mixing tank (1,000 gal.) equipped with a center mounted agitator. Carbon cake is added to a predetermined volume of water in the mixing tank in an amount sufficient to provide an aqueous suspension of the powdered carbon having a solids content of about 30 percent by weight. The suspension of carbon is then pumped to a radiantly heated reactor vessel consisting of a closed cylindrical tube 24 inches in diameter and 40 feet in height and equipped with a convection tube mounted in the upper portion of the reactor vessel having a diameter of 16 inches and a length of 6 feet. The reaction vessel wall is heated to a temperature of about 1900°F with radiant heat provided from five banks of burners consisting of six radially mounted burners each and the carbon suspension is continuously sprayed into the reactor vessel at a rate of 2.0 gallons per minute through a spraying nozzle mounted in the upper end wall of the reactor vessel, utilizing atomizing steam at a pressure of about 100 psig. The carbon suspension is heated to a temperature of about 1900°F within 4 seconds and is retained in the reactor vessel for an average residence time of about 9 seconds to reactivate the carbon by pyrolysis of the impurities. After this time, the reactivated carbon suspension is discharged from the reactor vessel through a 4 inch exit port located at the bottom of the reactor vessel and is passed into a quenching chamber. The carbon suspension is subjected to water sprays in the quenching chamber to cool the steam generated in the furnace. The resulting reactivated carbon suspension is then subjected to a scrubber wherein the pyrolysis gases generated during reactivation are removed from the carbon slurry to yield an aqueous suspension of reactivated carbon having a carbon content of 0.5 pounds per gallon at a temperature of about 190°F, in a yield greater than 90 percent by weight, and having a reactivation efficiency greater than about 95 percent.

EXAMPLE V

Spent powdered carbon of 325 mesh particle size suspended in an aqueous solution at a concentration of about 5 percent by weight is recovered by filtration using a plate filter to yield a carbon slurry having a solids content of about 50 percent. This carbon slurry is conveyed to a mixing tank (300 gal.) equipped with a center mounted agitator. Water is added to the carbon slurry in the mixing tank in an amount sufficient to provide an aqueous suspension of the powdered carbon having a solids content of about 30 percent by weight. The suspension of carbon is then pumped to a radiantly heated reactor vessel consisting of a closed cylindrical tube 12 inches in diameter and 10 feet in height and equipped with a convection tube mounted in the upper portion of the reactor vessel having a diameter of 7 inches and a length of about 3 feet. The reaction vessel wall is heated to a temperature of about 1800°F with radiant heat provided from five banks of burners consisting of four radially mounted burners each, and the carbon suspension is continuously sprayed into the reactor through a spraying nozzle mounted in the upper end wall of the reactor, utilizing atomizing steam at a pressure of about 50 psig. The carbon suspension is retained in the reactor vessel for a total residence time of about 5 seconds to reactivate the carbon by pyrolysis of the impurities. After this time, the reactivated carbon suspension is discharged from the reactor through a 4 inch exit port located at the bottom of the reactor and is passed into a quenching chamber. The carbon suspension is subjected to water sprays in the quenching chamber to cool the steam generated in the furnace. The resulting reactivated carbon suspension is then subjected to a scrubber wherein the pyrolysis gases generated during reactivation are removed from the carbon slurry to yield an aqueous suspension of reactivated carbon having a carbon content of 0.5 pounds per gallon at a temperature of about 180°F.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

I claim:
1. Apparatus for the reactivation of spent powdered carbon having organic matter adsorbed thereon, comprising:
an elongate, generally tubular reactor vessel having a wall and a bore, and an inlet at one of its ends and an outlet at the opposite end, and means generally sealing each of its ends to provide, with said wall, an enclosed reaction chamber in the bore of said vessel;
means communicating with said inlet end for supplying to said reaction chamber an aqueous slurry of spent carbon;
means for atomizing said aqueous slurry of spent carbon communicating with said inlet end; a convection tube coaxially disposed within said reaction chamber with its upper end positioned adjacent to but spaced from said outlet end and extending downwardly therefrom a distance no greater than about one-third the length of and spaced from said reactor vessel wall to provide an annulus thereabout;

heating means disposed about said reactor vessel wall for radiantly heating said wall to provide a temperature in said reaction chamber in the range from about 1200°F to about 1900°F; a refractory shell which forms a furnace wall coaxially disposed outside said reactor vessel; and means communicating with the outlet end of said reactor vessel for removing processed carbon from the reaction chamber.

2. Apparatus in accordance with claim 1, wherein the convection tube extends along the length of the reactor vessel wall a distance in the range from about one-tenth to about one-third of the length of the reactor vessel wall.

3. Apparatus in accordance with claim 1, wherein said means communicating with the inlet end of the reactor vessel includes an external mixing type nozzle, means to supply spent carbon in an aqueous slurry to the mixing nozzle, and means to supply steam to the mixing nozzle, said mixing nozzle being disposed to supply to the reaction chamber a dispersion of spent carbon in steam.

4. Apparatus in accordance with claim 1, wherein said heating means comprises a plurality of burners designed to provide short and wide flames that do not impinge on the reactor vessel wall and that heat the reactor vessel wall by radiation.

5. Apparatus for the reactivation of spent powdered carbon having organic matter adsorbed thereon, comprising:

an elongate, upright, generally tubular reactor vessel having a wall and a bore, and an inlet at its upper end and an outlet at its lower end, and means generally sealing each of its ends to provide, with said wall, an enclosed reaction chamber within said vessel;

external mixing nozzle means disposed at the inlet end of said reactor vessel and communicating with the enclosed reaction chamber, for supplying to the reaction chamber a stream of spent carbon dispersed in steam;

a convection tube disposed within the reaction chamber generally concentrically therewith, with one end of the convection tube extending downwardly for from one-tenth to one-third of the length of the reactor vessel wall, and being spaced from the reactor vessel wall to provide an annulus thereabout;

heating means disposed about said reactor vessel wall for radiantly heating said wall to provide temperatures in said reaction chamber in the range from about 1200°F to about 1900°F; a refractory shell which forms a furnace wall coaxially disposed outside said reactor vessel; and means communicating with the outlet end of said vessel for removing processed reactivated carbon from the reaction chamber.

* * * * *